Sept. 17, 1968
F. L. KRADEL
3,402,351
PHASE AND VOLTAGE DETECTOR
Filed May 20, 1965
2 Sheets-Sheet 1
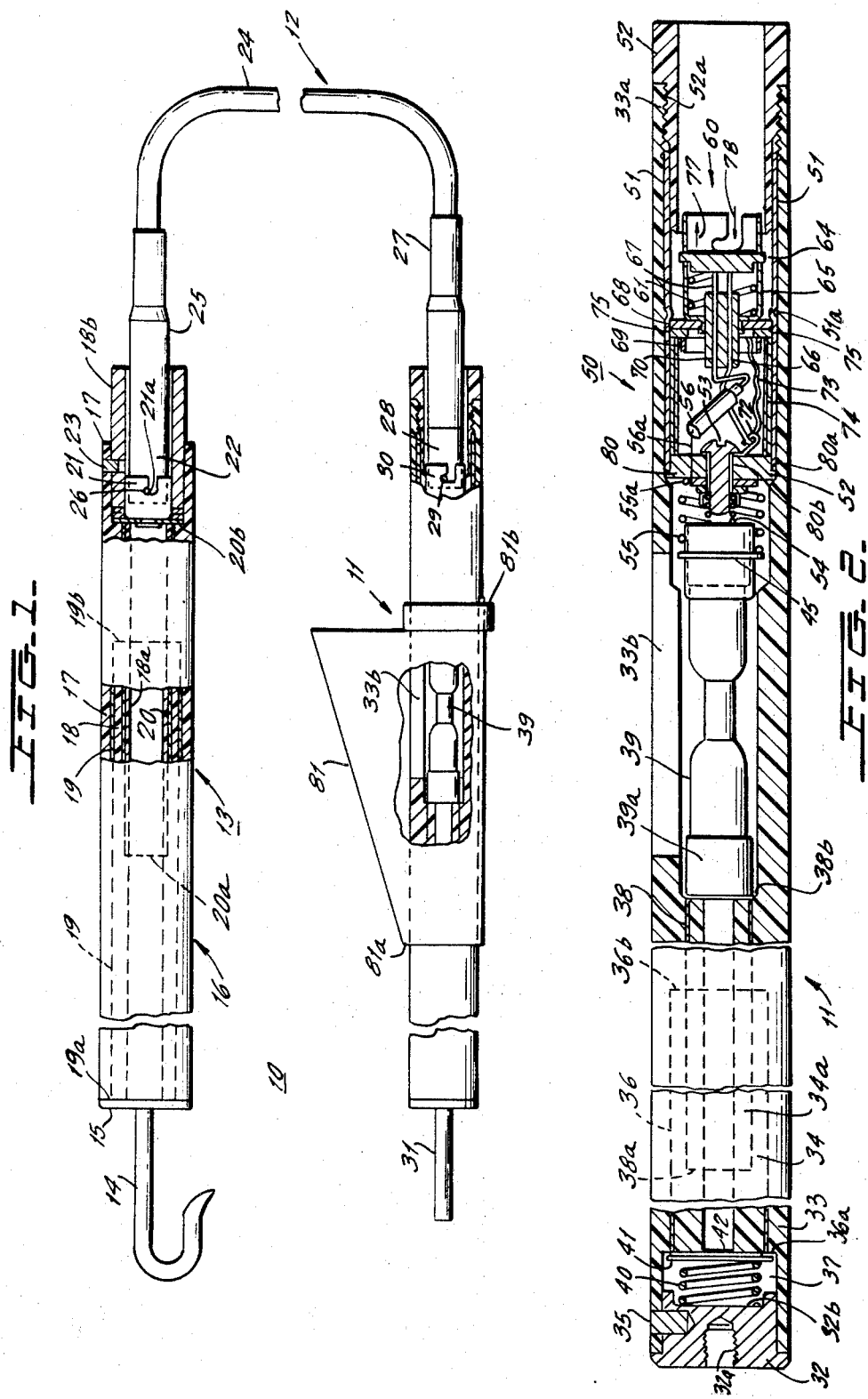

Sept. 17, 1968  F. L. KRADEL  3,402,351
PHASE AND VOLTAGE DETECTOR
Filed May 20, 1965  2 Sheets-Sheet 2
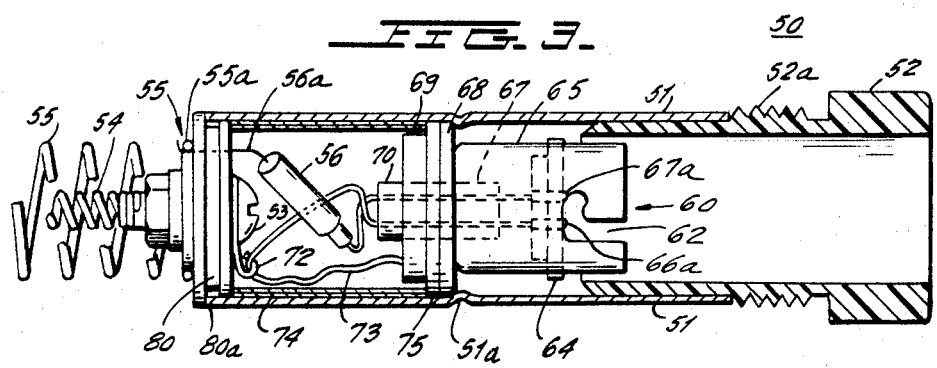
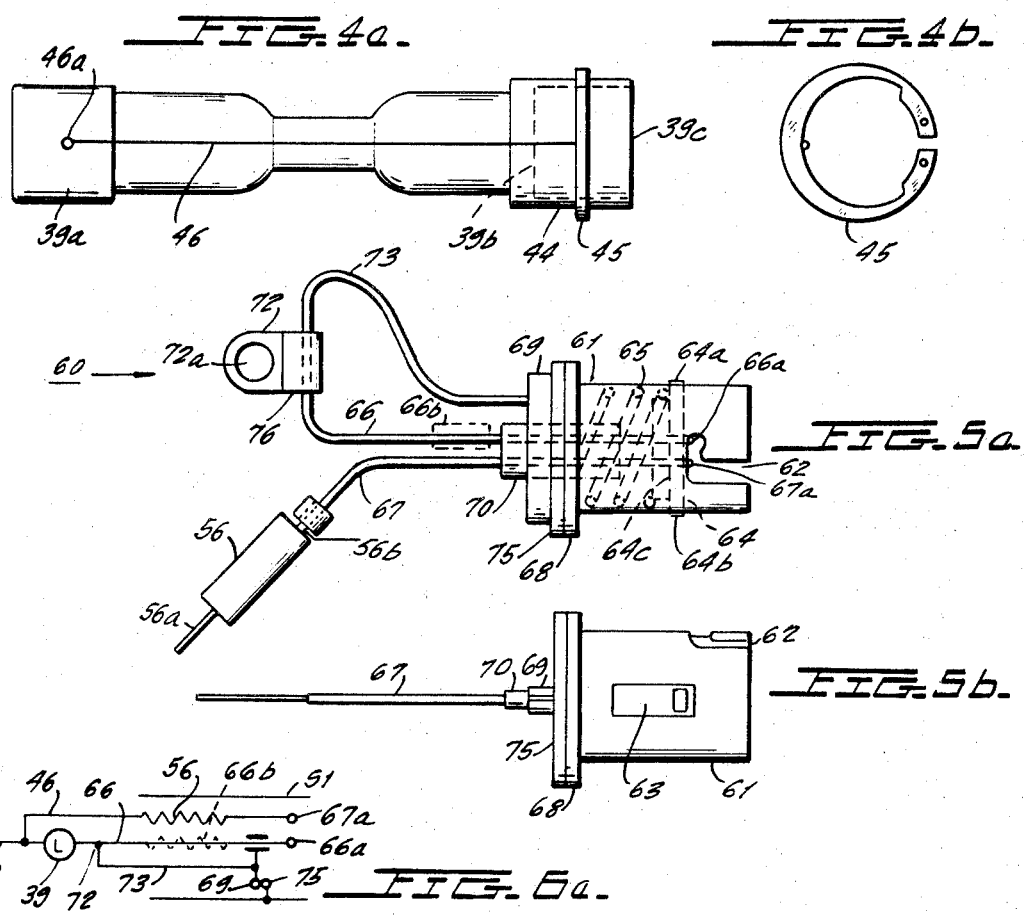
INVENTOR.
FRED L. KRADEL
BY Ostrolenk, Faber, Gerb & Soffen
ATTORNEYS

United States Patent Office 3,402,351
Patented Sept. 17, 1968

3,402,351
PHASE AND VOLTAGE DETECTOR
Fred L. Kradel, Greensburg, Pa., assignor to I-T-E Circuit Breaker Company, Philadelphia, Pa., a corporation of Pennsylvania
Filed May 20, 1965, Ser. No. 457,287
3 Claims. (Cl. 324—87)

ABSTRACT OF THE DISCLOSURE

A testing device, for determining the phase relationship of voltages as between two or more circuits and also for determining the presence of a voltage in a circuit, is provided with a voltage detector having a switching means which is automatically operative upon connection of a connecting cable and coupler unit to the voltage detector to convert the testing device from a voltage detector to a phase detector.

---

The instant invention relates to circuit testing means and more particularly to a combination phase detector and voltage detector means adaptable for use in determining the phase relationship of voltages as between two or more circuits and also to determine the presence of voltage in a circuit wherein the components of the phase detector means are automatically conditioned for the appropriate operation which the phase detector means is to perform.

In the maintenance, repair and general observation of power distribution networks, substations and the like, it quite frequently is necessary to determine the relationship of phases between two circuits of the same synchronized system. It is further desirable to ascertain whether a particular circuit is live, that is, energized. In order to meet with these requirements, a phase detector means has been designed to perform both of these functions. The phase detector means is normally comprised of three components, namely, the detector unit, a coupler unit and a cable unit for interconnecting the detector and coupling units. The detector unit is a substantially elongated, cylindrically-shaped member having an electrode member at one end which is capacitively coupled to a neon glow lamp positioned within the detector housing. In cases where the phase detection operation is to be performed, the end opposite the electrode end of the detector unit is coupled to one end of the connecting cable, the other end of which is connected to the coupler unit. The coupler unit is likewise provided with an electrode at one end of a substantially elongated cylindrical housing which is similar to the detector unit housing. The opposite end of the coupler unit is electrically connected to the opposite end of the connecting cable. The detector unit electrode is capacitively coupled to the connecting cable through the neon glow lamp and parallel resistor. The phase relationship operation is performed by making electrical contact between the two circuits through the electrodes provided on the detector and coupler units. In cases where there is phase synchronism and same phase relationship (better known as "in phase") between the circuits, the glow lamp provided in the detector unit will not be lit. In cases of out of phase relationship the glow lamp will burn brightly to denote the out of phase condition.

In order to prevent the glow lamp from lighting during an in phase condition, suitable impedance is connected in parallel across the terminals of the glow lamp.

When performing the high voltage test the coupler unit is disconnected from the detector unit by removing the connecting cable from the detecting unit and engaging the circuit to be tested for its voltage condition with the detector electrode. The opposite end of the detector unit is held in the hand and is arranged so as to provide capacitive coupling between the operator's hand at a first end of the glow lamp, the opposite end of which is, in turn, capacitively coupled to the detector unit electrode. The detector unit is capable of detecting the presence of potential in circuits from 2400 volts up.

In the case where it is desired to perform the potential checking operation, means are provided for electrically connecting one end of the glow lamp to a conducting metallic sleeve which is insulated from the hand of the operator by a surrounding insulating sleeve. When the phase detection operation is to be performed, it is necessary that the connection between the glow lamp and the conductive sleeve forming part of the hand capacitance arrangement be severed and that the impedance means be placed in parallel across the glow lamp.

The instant invention provides these functions automatically and simply by virtue of the connection or disconnection of the connecting cable.

The instant invention provides in the detector housing a socket means for receiving a first end of the connecting cable. In the absence of the connecting cable first end the terminal of the socket which is connected to the lower end of the glow lamp is also, through biased means, electrically connected to the conductive sleeve forming a part of the hand capacitance circuit. This automatically conditions the detector unit for use in the potential checking operation.

In order to perform the phase detection operation a first end of the connecting cable is locked in the position in the detector unit socket urging the socket base member against the biasing force provided therein so as to electrically disconnect a first or lower end of the glow lamp from the conductive sleeve provided within the detector unit and which forms part of the hand capacitance circuit. In addition thereto, the end of the connecting cable which is locked into position in the socket completes a circuit including at least one impedance member, which circuit places the impedance member in parallel across the glow lamp so as to condition the phase detection unit for use in the phase detection operation. By imposing the impedance means in parallel across the glow lamp member this arrangement guarantees that the phase detector glow lamp will not glow in the presence of an in phase condition, as was previously mentioned. The connecting cable and detector unit socket means are so designed as to permit the connection and disconnection therebetween to be performed simply and readily with these connection and disconnection operations automatically conditioning the detector unit for the test to be performed.

It is therefore one object of the instant invention to provide novel means for performing both phase detection and potential checking operations.

Still another object of the instant invention is to provide a novel means for performing phase detection and potential checking operations, which means is automatically conditioned for the function which it is to perform by virtue of the manner in which it is connected.

Another object of the instant invention is to provide novel means for performing both phase detection and potential checking operations, which means is comprised of a detector unit, a coupler unit and a connecting cable.

Another object of the instant invention is to provide novel means for performing both phase detection and potential checking operations, which means is comprised of a detector unit, a coupler unit and a connecting cable wherein the coupler unit is automatically conditioned for performing the phase detection operation when coupled to the connecting cable.

Another object of the instant invention is to provide novel means for performing both phase detection and potential checking operations, which means is comprised of a detector unit, a coupler unit and a connecting cable wherein the detector unit is automatically conditioned for performing the potential checking operation upon removal of the connecting cable.

Still another object of the instant invention is to provide novel means for performing both phase detection and potential checking operations wherein said means is comprised of a detector unit having an assembly normally biasing the unit for use in a potential checking operation and which is adapted to receive a connecting cable to automatically position the assembly for performing the phase detection operation.

These, and other objects of the instant invention will become apparent when reading the accompanying description and drawings in which:

FIGURE 1 is a plan view of a phase detector means designed in accordance with the principles of the instant invention and further showing portions of the apparatus broken away to expose the inner components thereof.

FIGURE 2 is a side plan view of the detector unit of FIGURE 1 which is partially sectionalized to show the detector unit assembly in greater detail.

FIGURE 3 is a sectional view showing a portion of the detector unit of FIGURE 2.

FIGURE 4a is a side view showing the neon glow lamp of FIGURE 2.

FIGURE 4b is an end view showing one element of the neon glow lamp assembly of FIGURE 4a.

FIGURES 5a and 5b are plane and side views respectively, of the socket employed in the detector unit of FIGURES 2 and 3.

FIGURES 6a and 6b are schematic diagrams showing the internal connections of the detector unit in the potential checking and phase detection positions.

Referring now to the drawings, and more particularly to FIGURE 1, there is shown therein a phase detector means 10 comprised generally of a detector unit 11, connecting cable 12 and coupling 13.

The coupling unit 13 is comprised of a hook-shaped electrode member 14 having a base portion 15 secured to an elongated cylindrical housing 16. Housing 16 contains two foil cylinders 19 and 20, interwound between spirals of paper base phenolic or the equivalent. Cylinder 19 extends from 19a to 19b. Cylinder 20 extends from 20a to 20b. Where foil cylinders 19 and 20 overlap, an electric capacitance results. The right-hand end 20b of metallic sleeve 20 is electrically connected to a socket means 21 which receives one end 22 of the cable 12. Insulating sleeves 17 and 18b are keyed to one another by a pin member 23 which is received by suitable apertures provided in the sleeves 17 and 18b. Thus it can be seen that the socket 21 of coupler unit 13 is capacitively coupled to the electrode member 14.

The connecting cable 12 is provided with a suitable stranded conductor (not shown) surrounded by suitable insulating means 24. The first end thereof is provided with a flexible insulating sleeve 25 which is positioned partially over the end cap 22 and insulating means 24 of connecting cable 12. The end cap 22 is a conductive cap or ferrule which is electrically connected to the end of the cable adjacent thereto and which is further provided with first and second ears (only one of said ears being shown in FIGURE 1) 26, which locks cable 12 to socket 21 by inserting end cap 22 into the socket and slightly rotating end cap 22 relative to socket 21 so that the ears 26 are positioned in the manner shown in FIGURE 1. Suitable bias means (not shown) are provided immediately adjacent the base of socket 21 so as to urge the ear 26 against the shoulder 21a provided in socket 21.

The opposite end of connecting cable 12 is likewise provided with a resilient insulating sleeve 27 and with an end cap 28 connected to the conductor of cable 12 in a similar manner and being provided with ears 29 in order to provide locking engagement between end cap 28 and socket 30 of detector unit 11.

Considering both FIGURES 1 and 2, the detector unit 11 is comprised of an electrode member 31 which is threaded at one end thereof so as to make threaded engagement with a tapped aperture 32a provided in the electrode base 32. The detector unit is further comprised of first and second elongated cylindrically-shaped insulating sleeves 33 and 34. The outer sleeve 33 is provided with a suitable aperture for receiving a phenolic rod 35 which keys electrode base 32 to insulating sleeve 33.

Detector housing contains two foil cylinders 36 and 38 interwound between spirals of paper base phenolic or the equivalent. Cylinder 36 extends from 36a to 36b. Cylinder 38 extends from 38a to 38b. Where foil cylinders 36 and 38 overlap, an electric capacitance results. The right-hand end 38b of inner foil sleeve 38 terminates in a cavity provided for receiving neon glow lamp 39. The glow lamp 39 is provided with a first end cap 39a which makes electrical contact with the right-hand end 38b of foil sleeve 38.

The inner, or right-hand surface, 32b of metallic electrode base 32 is arranged so as to seat one end of a spring member 40, the opposite end of which bears against a substantially cylindrical metallic disc 41. The right-hand surface of metallic disc 41 is separated a minute distance from the end of outer foil sleeve 36 by means of a spark gap spacing member 42. The spark gap spacing member 42 is formed of a square piece of insulating material and has a diagonal which is approximately equal to the diameter of cavity 37 so that the outer periphery of the metallic disc 41 is separated from the left-hand end of outer foil sleeve 36 by minute air gaps. The purpose of the spark gap or gaps provided between conductive disc 41 and the left-hand end of outer foil sleeve 36 is to control the intensity of the glow of the glow lamp.

Once the spark gap connection has been established, an electrical circuit extends from the electrode 31 through conductive electrode base 32, spring means 40, conductive disc 41 to outer foil sleeve 36. Inner foil 38 capacitively couples outer foil 36 to the left-hand end cap 39a of neon glow lamp 39.

Turning now to FIGURES 4a and 4b, the neon glow lamp 39 is comprised of metallic end caps 39a and 39b. An insulating sleeve 44 is positioned over the end cap 39b and sleeve 44, being open at both ends, exposes the right-hand surface 39c of end cap 39b. A metallic ring 45, shown also in FIGURE 4, is positioned around the insulating sleeve member 44 and is secured thereto in any suitable manner. The conductive ring 45 is electrically connected to end cap 39a through a bare copper wire 46. The opposite end of copper wire 46 is electrically connected at 46a to the metallic end cap 39a. This assembly is provided for the purpose of facilitating the connection of impedance means across the neon glow lamp in a manner to be more fully described.

Turning now to FIGURES 2 and 3, the phase detector assembly 50 mounted in the right-hand end of detector unit 11 is shown in detail and is comprised of a metallic conductive sleeve 51 having a generally cylindrical configuration and being immediately positioned adjacent the outer insulating housing 33. The sleeve 51 is secured in position by means of an insert 52 being threaded at one portion 52a thereof so as to threadedly engage the tapped inner surface 33a of insulating housing 33. The sleeve 51 is provided with a circular indentation 51a surrounding sleeve 51. A disc like insulating member 80 is positioned at the left-hand end of sleeve 51 and is provided with a shoulder 80a against which sleeve 51 bears. Insulating member 80 is provided with a centrally located opening 80b for receiving a threaded fastener 53. The opposite end of threaded fastener 53 protrudes through the opening 80b and has a spring member 54 surrounding a portion of its left-hand end. The opposite end of spring member 54 bears against the surface 39c of end cap 39b of the neon glow lamp 39 (see also FIGURE 4a). A second spring member 55 is provided which has a larger diameter than spring 54 and has a first end thereof bearing against the cylindrical ring 45. The opposite end of spring member 55 bears against the lefthand surface of insulating member 80 and is electrically connected at 55a to one lead 56a of resistor element 46. This lead 56a protrudes through a suitable opening in insulating member 80.

Consider now FIGURES 5a and 5b. There is shown therein a bayonet lamp socket assembly 60 housed within the detector unit 11, which assembly 60 is comprised of a bayonet lamp socket 61 provided with the cut 62 for receiving the ears 29 of the connecting cable 12 (see FIGURE 1). Bayonet lamp socket 61 is provided with two elongated slots 63, note especially FIGURE 5b, which slidably receive the left and right-hand ends 64a and 64b, respectively, of an insulating member 64. The insulating member 64 is biased in the position shown in FIGURES 5a and 5b by means of a biasing spring 65, the right end of which bears against the shoulder 64c of insulating member 64 and the left end of which bears against the base of bayonet lamp socket 61. The insulating member 64 is provided with suitable openings for receiving insulated conductive leads 66 and 67, the right ends of which 66a and 67a protrude through insulating member 64 and are soldered to eyelet in right surface of 64.

An insulating washer 68 is secured to the left end of the bayonet lamp socket 61. To the left of washer 68 is a copper washer 75 which makes contact to brass sleeve or cylinder 51. The insulated leads 66 and 67 which extend to the right through washers 68 and 75 and flattened ring 69 are additionally insulated therefrom by means of a piece of insulating tubing 70. Lead 67 is electrically connected to one terminal 56b of a resistor member 56. Lead 66 is secured, such as by soldering or pressing to a flag-type terminal 72. A third insulated lead 73 has a first end thereof secured to terminal 72 and a second end thereof secured and electrically connected to flattened copper ring 69.

As can best be seen in FIGURE 2, the bayonet socket assembly 60 is mounted within the right-hand interior of detector unit 11 with the copper washer 75 electrically engaging the metallic cylinder 51 and having its right-hand surface bearing against insulating washer 68. An insulating sleeve or spiral of tape 74 has its left-hand end bearing against the insulating member 80 and its right-hand end bearing against the left-hand surface of washer 75, acting to rigidly secure washer 75 within the detector unit 11 so as to prevent the socket assembly 60 from experiencing any movement relative to the detector unit housing. The insulating sleeve 70 is secured to the flattened copper ring 69 and any movement experienced by sleeve 70 is imparted to flattened ring 69 for a purpose to be more fully described. As can clearly be seen in FIGURE 2, the flag-type terminal 72 which is provided with an aperture 72a receives the fastening member 53 and is electrically connected thereto.

FIGURES 6a and 6b are schematic diagrams showing the detector assembly contained within detector unit 11. As is shown therein, the inner foil 38 is electrically connected to the left-hand end of neon glow lamp 39, the opposite terminal of which is electrically connected to conductors 66 and 73. The left-hand terminal of neon glow lamp 39 is electrically connected through to copper wire 46 (and ring 45, spring means 55 and lead 56a) to the resistor 56. The opposite terminal of resistor 56 is connected to the lead 67 which has its right end 67a exposed at the right-hand surface of the insulating member 64 in the socket assembly 60.

The right-hand terminal of neon glow lamp 39 is also electrically connected to the lead 66 which may have a resistor element at 66b, as shown in FIGURE 5a. The opposite end of this lead 66 is exposed at the right-hand surface of insulating member 64. The flattened copper ring 69 is shown in FIGURES 6a and 6b as a contact and the washer 75 is shown in these figures as a cooperating contact which is electrically connected with the conductive sleeve 51.

Consider FIGURES 2, 6a and 6b. The operation of the detector unit is as follows:

When the detector unit is employed as a potential checking device, the connecting cable 12 (see FIGURE 1) is not employed for this test. This causes the spring member 65 to urge the insulating member in the direction shown by arrow 77 of FIGURE 2 to the position shown in FIGURE 2. Since the flattened copper ring 69 is secured to the insulating member 64 through the leads 66 and 67, this causes the ring 69 to bear against the washer 75 in the manner shown in FIGURES 2 and 6a. This establishes an electrical path from the neon glow lamp 39 through conductor 73, ring 69 and washer 75 to the conductive sleeve 51. The detector unit 11 is used by the operator by grasping the detector unit 11 with the hand of the operator being placed around the right-hand end of detector unit 11 so that a capacitive coupling exists between the conductive sleeve 51 and the operator's hand (not shown). Since the connecting cable 12 is not employed in the potential checking operation, the free ends 66a and 67a of the conductors 66 and 67 are not electrically connected and hence art out of the circuit.

In order to perform the phase checking operation, the connecting cable 12 is connected to the detector unit 11 and the coupler unit 13 in the manner shown in FIGURE 1. Turning to FIGURE 2, this connection causes the connecting cable end cap 28 to urge insulating member 64 in the direction shown by arrow 78 of FIGURE 2, causing the copper ring 69 to move in the same direction, thereby disengaging ring 69 from metallic washer 75. Separation can clearly be seen in FIGURE 6b. The insertion of the connecting cable end cap 28 provides an electrical path between the ends 66a and 67a of conductors 66 and 67, respectively, so as to connect the resistors 56 (and 66b if used in series) and place this resistance in parallel across the glow lamp 39 in the manner shown in FIGURE 6b.

Thus, the total electrical path in the detection unit 11, considering FIGURES 1 and 2, extends from the electrode 31 to the spark gap arrangement 41 and 42 to outer foil 36 which is capacitively coupled to the outer foil 19 which, in turn, is electrically connected to electrode 14. It has been found that the resistor elements 56 and 66b (element 66b being optional) provides superior operating results for the phase detector assembly 10 by providing a complete lamp-off condition in cases of in-phase conditions and by providing a brilliant glow in cases of out-of-phase conditions, thus clearly distinguishing between the two cases.

The glow lamp 39 may be readily observed through the elongated opening 33b provided in sleeves 33 and 34, exposing glow lamp 39 to view from the exterior of the housing. As shown in FIGURE 1, a shield 81 is provided and is secured at both ends 81a and 81b thereof to the detector unit 11 so as to shield direct sunlight from impinging upon the glow lamp 39 through the elongated opening 33b.

FIGURE 6b shows a resistance adapter member 100 which is connected in series with the single conductor cable in cases where phasing voltages of greater than 7.5 kv. ground to neutral are being tested. The resistance adapter member is designed to be easily inserted thereby further enhancing the flexibility of the phasetector device.

It can be seen from the foregoing that the voltage detector unit provided in the instant invention is so arranged that it is automatically conditioned for the function it is to perform in that the socket assembly described herein normally biases the detector unit for use in the potential checking manner and is movable when coupled to the connecting cable, into the phase checking position, thereby automatically conditioning itself for use.

Although there has been described a preferred embodiment of this novel invention, many variations and modifications will now be apparent to those skilled in the art. Therefore, this invention is to be limited, not by the specific disclosure herein, but only by the appending claims.

I claim:

1. Test means for use in selectively measuring voltage phase relationships and potential comprising: detector means, said detector means being an elongated cylindrical member; electrode means at a first end of said member; capacitance means provided in said member intermediate the ends of said member; spark gap means connecting said electrode means to said capacitance means; neon glow tube means having a first end connected to said capacitance means; a metallic cylinder means secured in said member near the second end thereof; metallic disc means positioned within and electrically connected to said second metallic cylinder means; bayonet type socket means mounted within said member at said second end for receiving an electrical connector, said socket means having a movably mounted insulating member provided with first and second apertures; said movably mounted insulating member being movable between a first and second position; a metallic ring mechanically linked to said insulating member; first conductor means electrically connecting said metallic ring and the second end of said neon glow tube means; second conductor means electrically connected to the second end of said neon glow tube means and protruding through the first aperture in said bayonet socket insulating member; third conductor means; impedance means having a first terminal connected to the first end of said neon glow tube means and having a second terminal connected to said third conductor means; said third conductor means protruding through the second aperture in said insulating member; means for biasing said insulating member to its first position causing said metallic ring to engage said metallic disc when said electrical connection means is not inserted in said bayonet type socket means whereby said metallic cylinder is electrically in series with said glow tube means; said insulating member movable to its second position responsive to the insertion of said electrical connection means in said bayonet type socket means to disengage said metallic ring from said metallic disc causing said metallic cylinder to be electrically disconnected from said glow tube means; said second and third conductor means protruding through said apertures in said insulating member responsive to the insertion of an electrical connector in said bayonet type socket means to electrically connect said glow tube means and said impedance means in parallel.

2. The test means as set forth in claim 1 further including coupling means comprising a second elongated cylindrical member having a second electrode means positioned at a first end thereof; second bayonet socket means positioned at the second end of said second member; second capacitance means connected between said second electrode means and said second bayonet socket means; and wherein said electrical connection means consist of an insulated conductor having first and second metallic end caps connected at opposite ends thereof; said first end cap being engageable with said second bayonet socket means; said second end cap being engageable with said first bayonet socket means; said second and third conductor means protruding through said apertures making electric contact with said second end cap.

3. The test means as set forth in claim 2 wherein said first capacitance means comprises a first cylindrical shaped foil electrode, a second cylindrical shaped foil having a smaller diameter than said first electrode and having a substantial portion thereof extending into the interior of said first electrode and being insulated therefrom.

References Cited

UNITED STATES PATENTS

| 1,615,788 | 1/1927 | Feldkamp | 324—149 |
| 1,867,901 | 7/1932 | Walter | 324—122 |
| 2,128,019 | 8/1938 | Sleeper | 324—122 |
| 2,500,725 | 3/1950 | West | 324—133 X |
| 2,610,237 | 9/1952 | Benner | 324—133 X |
| 3,287,642 | 11/1966 | Simkins | 324—149 |

FOREIGN PATENTS 0,303,198   5/1915   Germany.

RUDOLPH V. ROLINEC, *Primary Examiner.*

P. F. WILLE, *Assistant Examiner.*